United States Patent
Cleveland (12) 
(10) Patent No.: US 9,961,844 B2
(45) Date of Patent: May 8, 2018

(54) SYMBIOTIC AQUAPONIC GROWTH SYSTEM

(71) Applicant: Clayton D. Cleveland, Mokena, IL (US)

(72) Inventor: Clayton D. Cleveland, Mokena, IL (US)

( * ) Notice: Subject to any disclaimer, the term of this patent is extended or adjusted under 35 U.S.C. 154(b) by 410 days.

(21) Appl. No.: 14/885,162

(22) Filed: Oct. 16, 2015

(65) Prior Publication Data

US 2017/0105371 A1 Apr. 20, 2017

(51) Int. Cl.
*A01G 31/02* (2006.01)
*A01G 7/04* (2006.01)
*A01G 27/00* (2006.01)
*A01G 31/04* (2006.01)

(52) U.S. Cl.
CPC ............ *A01G 31/02* (2013.01); *A01G 7/045* (2013.01); *A01G 27/008* (2013.01); *A01G 31/047* (2013.01)

(58) Field of Classification Search
CPC ...... A01G 31/02; A01G 31/06; A01G 31/047; A01G 9/16; A01G 9/00; A01G 9/045; Y02P 60/216; A01K 63/04
See application file for complete search history.

(56) References Cited

U.S. PATENT DOCUMENTS

| | | | | |
|---|---|---|---|---|
| 3,943,658 A * | 3/1976 | Hai | ........................ | A01G 31/02 47/16 |
| 4,092,802 A * | 6/1978 | Oyama | ................... | A01G 31/02 47/16 |
| 4,258,501 A * | 3/1981 | Brown | ................. | A01G 31/047 47/16 |
| 5,315,834 A * | 5/1994 | Garunts | .................... | A61L 9/00 62/78 |
| 5,584,141 A * | 12/1996 | Johnson | ................... | A01G 9/00 47/39 |
| 6,442,893 B1 * | 9/2002 | Lai | ........................ | A01G 31/02 47/14 |

(Continued)

FOREIGN PATENT DOCUMENTS

| | | | | |
|---|---|---|---|---|
| CA | 2810087 A1 * | 9/2014 | ........... | F21V 21/005 |
| EP | 3155896 A1 * | 4/2017 | ............... | A01G 7/02 |

(Continued)

*Primary Examiner* — Joshua D Huson (57) ABSTRACT

A symbiotic aquaponic growth system is a system for growing plants. An aquaculture reservoir holds water and aquatic animals. Water and waste is transported to a filtering germination tray that serves to hold germinating seeds as well as to filter solid waste from the water. Plants are supported in a tubular growing member that rotates due to water flowing from the filtering germination tray onto the tubular growing member. The aquaculture reservoir, the filtering germination tray, and the tubular growing member are contained within an enclosure that may be closed via a lid and a shuttered door. Water is transported from the aquaculture reservoir to the filtering germination tray through a fluid distribution assembly. Water and nutrients are provided to plants in the tubular growing member by dipping the plant roots into the aquaculture reservoir as well by the water falling onto the plant roots from the filtering germination tray.

14 Claims, 11 Drawing Sheets

(56) References Cited

U.S. PATENT DOCUMENTS

| | | | | |
|---|---|---|---|---|
| 6,604,321 | B2* | 8/2003 | Marchildon | A01G 31/047 47/62 R |
| 7,730,663 | B2* | 6/2010 | Souvlos | A01G 31/047 47/62 C |
| 8,809,037 | B2* | 8/2014 | Haley, III | C02F 3/006 435/243 |
| 9,078,404 | B2* | 7/2015 | Chung | A01G 31/047 |
| 9,374,952 | B1* | 6/2016 | Cross | A01G 31/02 |
| 9,380,766 | B2* | 7/2016 | Limcaco | A01K 61/00 |
| 9,591,814 | B2* | 3/2017 | Collins | A01G 31/02 |
| 9,655,348 | B2* | 5/2017 | Lari | A01K 63/006 |
| 2002/0144461 | A1* | 10/2002 | Marchildon | A01G 31/047 47/65.5 |
| 2004/0060491 | A1* | 4/2004 | Leduc | A01G 31/02 111/105 |
| 2004/0149233 | A1* | 8/2004 | Cummins | A01K 63/00 119/227 |
| 2005/0011119 | A1* | 1/2005 | Bourgoin | A01G 31/047 47/61 |
| 2005/0055878 | A1* | 3/2005 | Dumont | A01G 31/047 47/62 R |
| 2009/0165373 | A1* | 7/2009 | Souvlos | A01G 31/047 47/65 |
| 2010/0071629 | A1* | 3/2010 | Wu | A01K 63/04 119/207 |
| 2012/0085026 | A1* | 4/2012 | Morris | A01G 31/06 47/62 A |
| 2013/0047508 | A1* | 2/2013 | Toone | A01G 31/02 47/62 R |
| 2014/0026481 | A1* | 1/2014 | Podmajersky | A62C 5/02 47/62 N |
| 2014/0059928 | A1* | 3/2014 | McAleer | A01G 31/047 47/65.7 |
| 2014/0165468 | A1* | 6/2014 | Roeser | A01G 9/12 47/62 R |
| 2014/0196363 | A1* | 7/2014 | Chung | A01G 31/047 47/1.7 |
| 2014/0223818 | A1* | 8/2014 | Coghlan | A01G 31/047 47/62 R |
| 2014/0318012 | A1* | 10/2014 | Fujiyama | F24F 11/0001 47/62 R |
| 2014/0325906 | A1* | 11/2014 | Marchildon | A01G 31/047 47/66.6 |
| 2015/0181821 | A1* | 7/2015 | Park, II | A01K 63/003 47/62 R |
| 2015/0208592 | A1* | 7/2015 | Marchildon | A01G 31/047 47/79 |
| 2015/0223418 | A1* | 8/2015 | Collins | A01G 31/02 47/62 R |
| 2015/0264897 | A1* | 9/2015 | Limcaco | A01K 61/00 119/224 |
| 2015/0305261 | A1* | 10/2015 | Wilson | A01G 7/045 47/62 A |

FOREIGN PATENT DOCUMENTS

| | | | | |
|---|---|---|---|---|
| FR | 2957224 A1 | * | 9/2011 | A01C 1/02 |
| WO | WO-2013035649 A1 | * | 3/2013 | A01G 7/00 |
| WO | WO-2015143105 A2 | * | 9/2015 | A01G 7/045 |

\* cited by examiner

SECTION A-A

SECTION B-B

SECTION C-C

SECTION D-D

FIG. 11

SYMBIOTIC AQUAPONIC GROWTH SYSTEM

FIELD OF THE INVENTION

The present invention relates generally to a growing system for fruits and vegetables. More specifically, the present invention is a symbiotic aquaponic growth system for growing plants. Plants are provided nutrients, water, and light for proper growth through the present invention.

BACKGROUND OF THE INVENTION

Obtaining fresh fruits and vegetables is generally only possible by purchasing the fruits and vegetables from a market. If one does not wish to purchase fruits and vegetables from an external source, it is possible to grow fresh fruits and vegetables in a personal garden. However, due to space considerations, this is not always feasible. An alternative method to growing plants in soil is by growing the plants in a hydroponic growing system. A hydroponic system eliminates the need for soil and plants are grown in water with mineral nutrient solutions. An aquaponic system combines a hydroponic system with an aquaculture system in order to form a symbiotic relationship. In a traditional aquaponic system, water containing excretions and other waste from the aquaculture system is fed into the hydroponic system. The byproducts in the water from the aquaculture system are broken down by nitrification into nitrates and nitrites, allowing the plants in the hydroponic system to acquire nutrients from the aquaculture system. The water is then recirculated back to the aquaculture system. Aquaponic systems are advantageous as food may be grown year round regardless of the natural environment. The present invention seeks to improve upon the benefits provided by conventional aquaponic growth systems.

The present invention is a symbiotic aquaponic growth system that allows for the growth of plants in virtually any environment. The present invention provides nutrients, water, and light to allow plants to grow. Nutrients are provided from the waste of fish or other aquatic species within the present invention. The present invention additionally provides a space for seed germination before the resulting plants are grown in the present invention. The present invention has minimal electrical power requirements in order to function and may be utilized in environments with or without natural light.

DETAIL DESCRIPTIONS OF THE INVENTION

All illustrations of the drawings are for the purpose of describing selected versions of the present invention and are not intended to limit the scope of the present invention.

The present invention is a symbiotic aquaponic growth system for growing plants. Plants are able to receive water and nutrients through the present invention in a symbiotic system. The present invention is shown in FIGS. 1-5 and comprises an enclosure 1, a filtering germination tray 7, a tubular growing member 5, an aquaculture reservoir 14, a plurality of plant container slots 15, and a fluid distribution assembly 16.

The enclosure 1 serves as a housing for the components of the present invention and is designed in a manner such that the present invention is inconspicuous when used in a home environment. For example, the enclosure 1 may be designed to resemble a conventional washing machine. The enclosure 1 comprises a base 2, a lip 3, and a top end 4. The base 2 and the top end 4 are positioned opposite to each other on the enclosure 1 and serve as opposite ends of the enclosure 1. The base 2 provides a stable foundation for the present invention to rest upon. The top end 4 is the end through which the filtering germination tray 7 is inserted into the enclosure 1 and is preferably open. The filtering germination tray 7 holds multiple plants while the plants are being grown from seeds. The filtering germination tray 7 additionally filters waste from water that is delivered from the aquaculture reservoir 14. The lip 3 serves as a resting surface for the filtering germination tray 7 when the filtering germination tray 7 is inserted into the enclosure 1. The lip 3 is connected within the top end 4 to provide a surface within the enclosure 1 for the filtering germination tray 7. The filtering germination tray 7 is seated onto the lip 3, providing stability for the filtering germination tray 7 when inserted within the enclosure 1.

Figure 1:
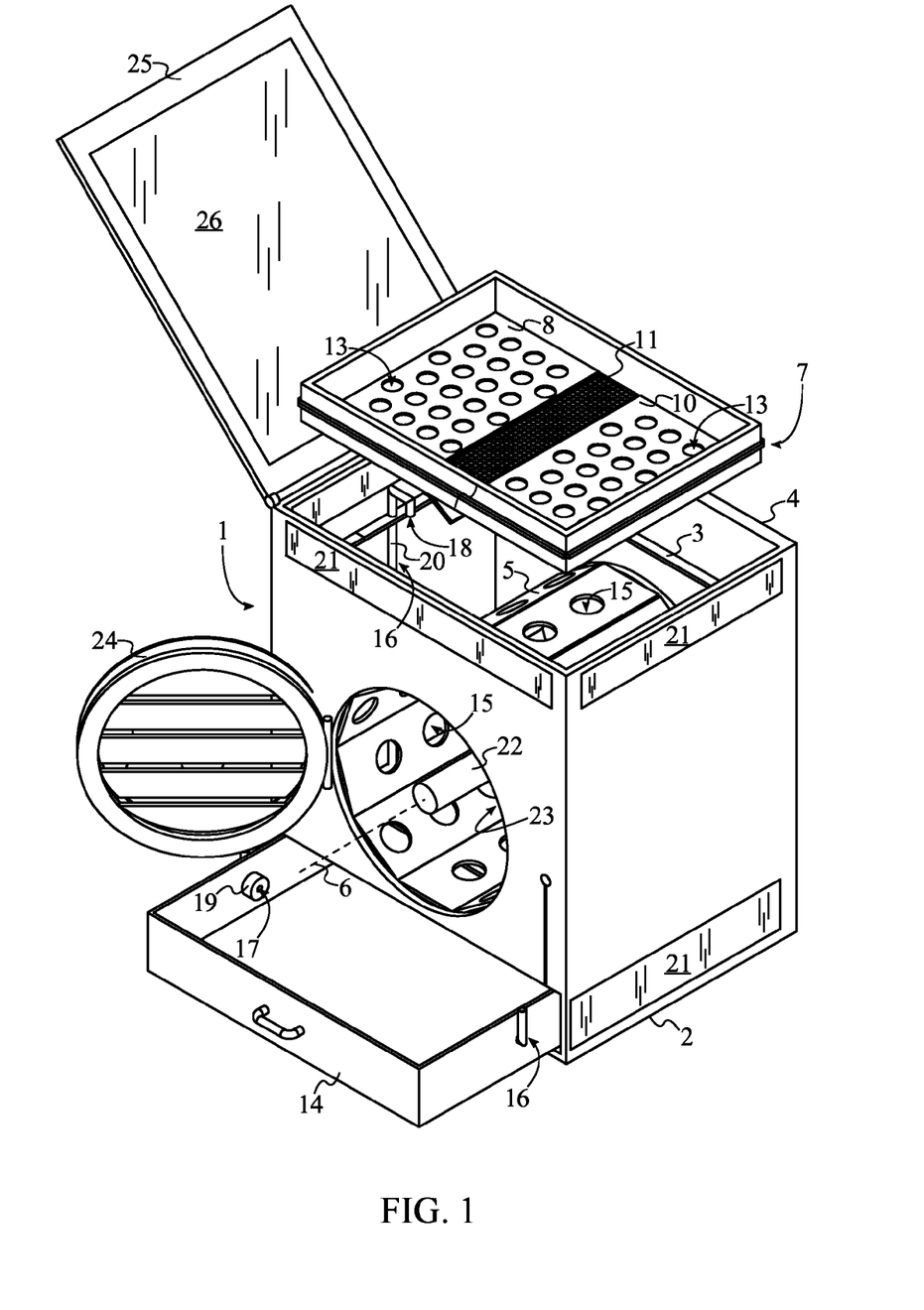
FIG. 1 is an exploded perspective view of the present invention.
Figure 2:
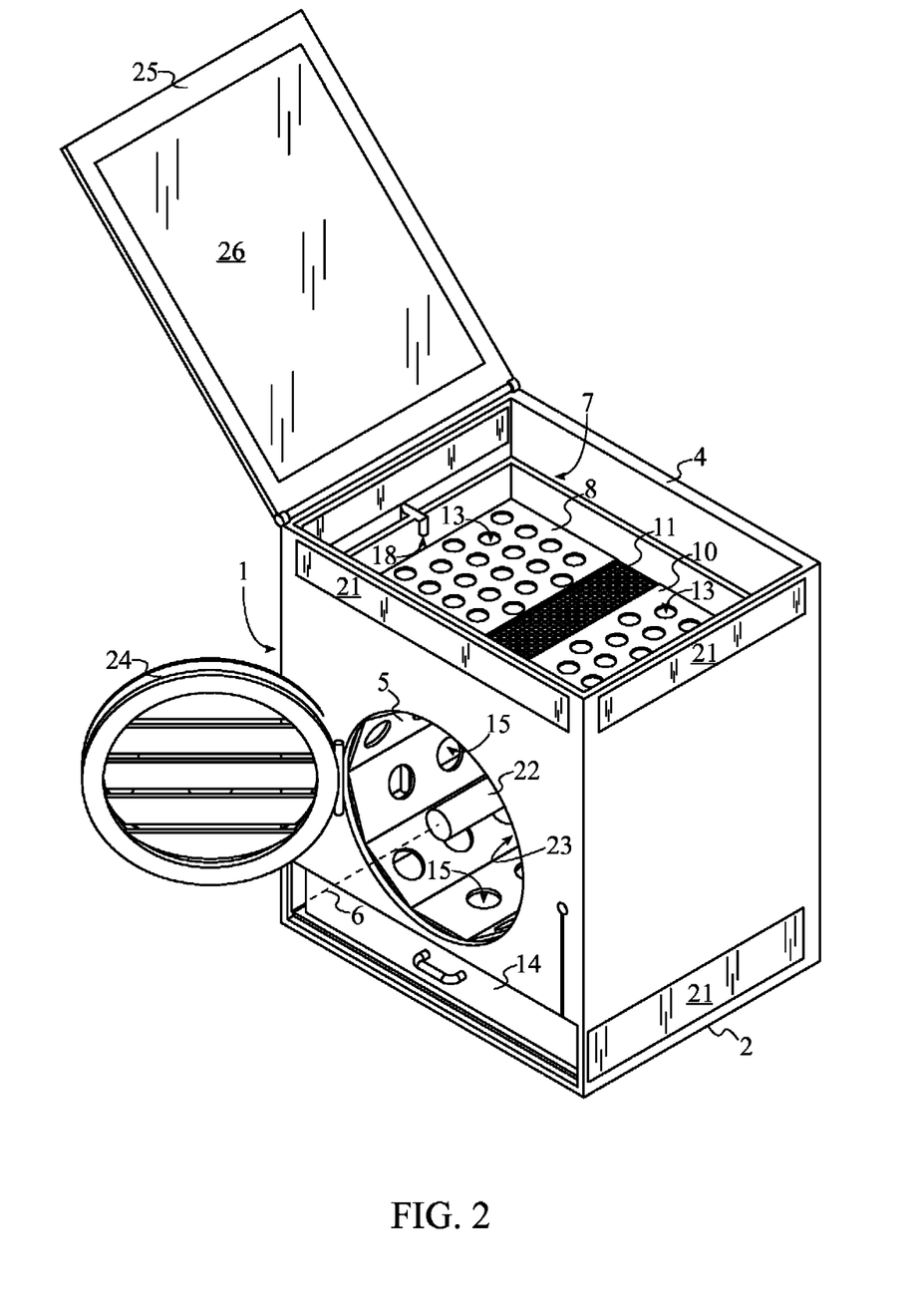
FIG. 2 is a perspective view of the present invention with open lid and open shuttered door.

The tubular growing member 5 holds multiple plants while the plants are being grown within the enclosure 1. The tubular growing member 5 is rotatably mounted within the enclosure 1 in between the base 2 and the top end 4. Rotation for the tubular growing member 5 may be enabled through the user of a bolt, pin, or similar device utilized to mount the tubular growing member 5 within the enclosure. The filtering germination tray 7 allows water to fall freely onto the tubular growing member 5, causing the tubular growing member 5 to rotate. This eliminates the need for a motor to rotate the tubular growing member 5. The tubular growing member 5 is positioned in between the filtering germination tray 7 and the aquaculture reservoir 14, thus allowing the water to fall onto the tubular growing member 5 from the filtering germination tray 7 after being transported from the aquaculture reservoir 14. As shown in FIG. 1 and FIG. 2, an axis 6 of the tubular growing member 5 is oriented parallel to the base 2, thus positioning the tubular growing member 5 in a manner such that the tubular growing member 5 is able to rotate when water from the filtering germination tray 7 falls onto the tubular growing member 5.

Figure 6:
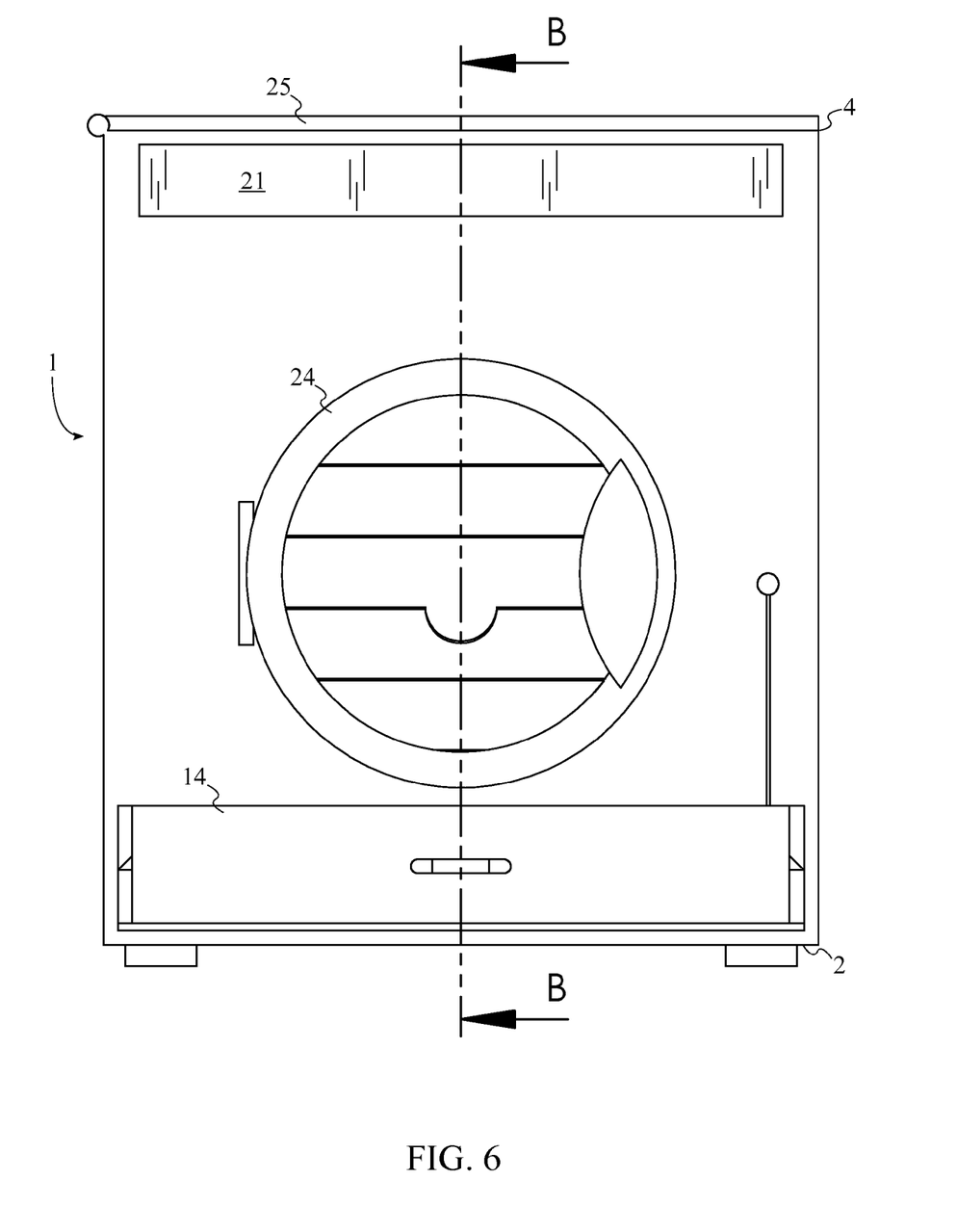
FIG. 6 is a front view of the present invention.
Figure 7:
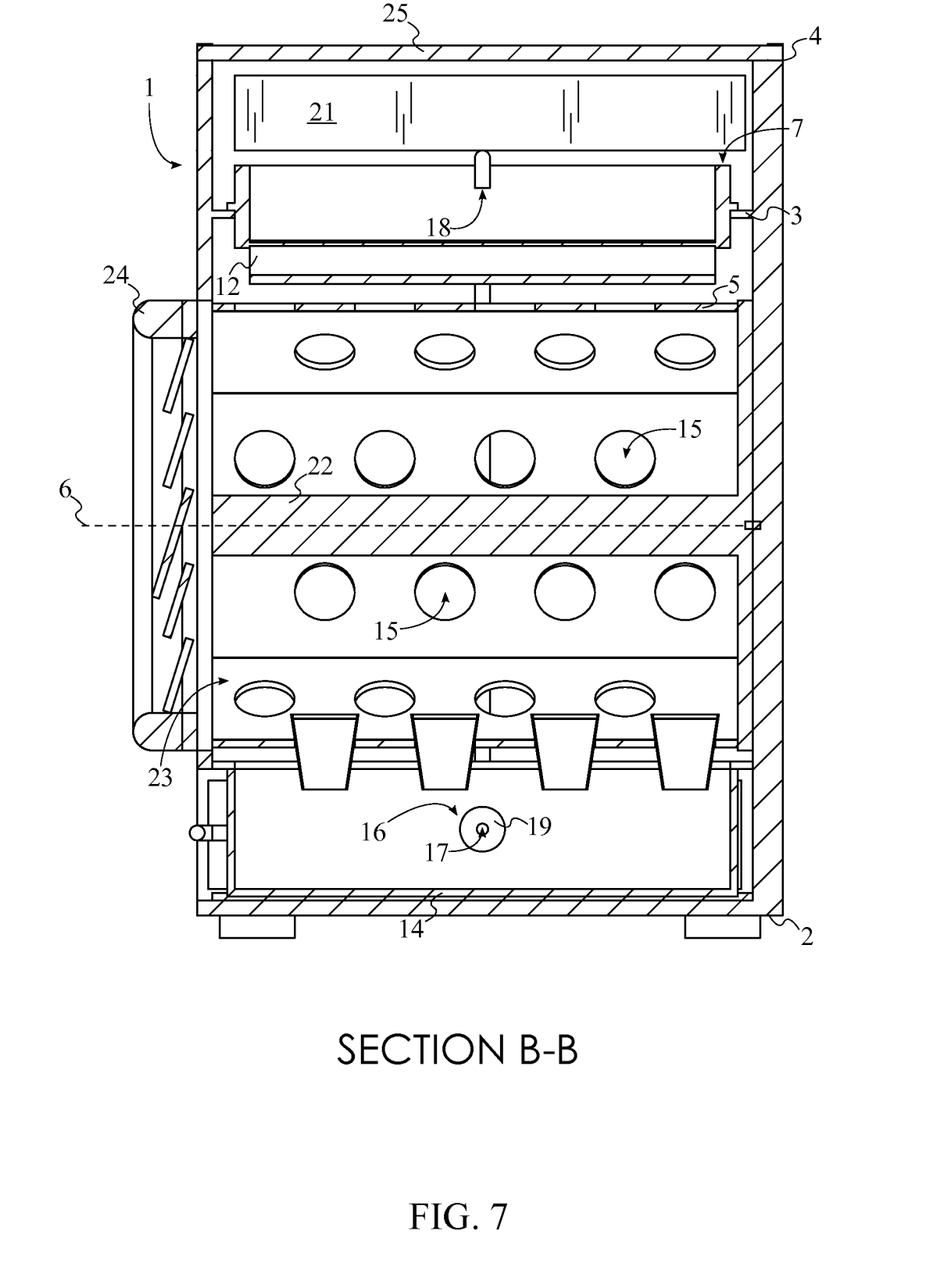
FIG. 7 is a cross-sectional view of the present invention taken along line B-B of FIG. 6.

Plants and soil may be held within vessels (e.g. cups) while being held on the tubular growing member 5 as shown in FIG. 6 and FIG. 7. Alternative growing mediums to soil may be utilized as well. The plants and soil may be held in place within the vessels via fine mesh netting or a similar means of preventing the plants and soil from falling out of the vessels while the tubular growing member 5 is rotating.

The plurality of plant container slots 15 is able to hold multiple vessels in place on the tubular growing member 5. The plurality of plant container slots 15 laterally traverses into the tubular growing member 5. The user is thus able to insert the plant and soil-holding vessels into the plurality of plant container slots 15. When inserted into the plurality of plant container slots 15, the plant and soil-holding vessels are oriented in a manner such that the roots of the plants within the vessels are positioned outward from the tubular growing member 5. This enables the plant roots to be exposed to water and oxygen while the tubular growing member 5 rotates.

Figure 5:
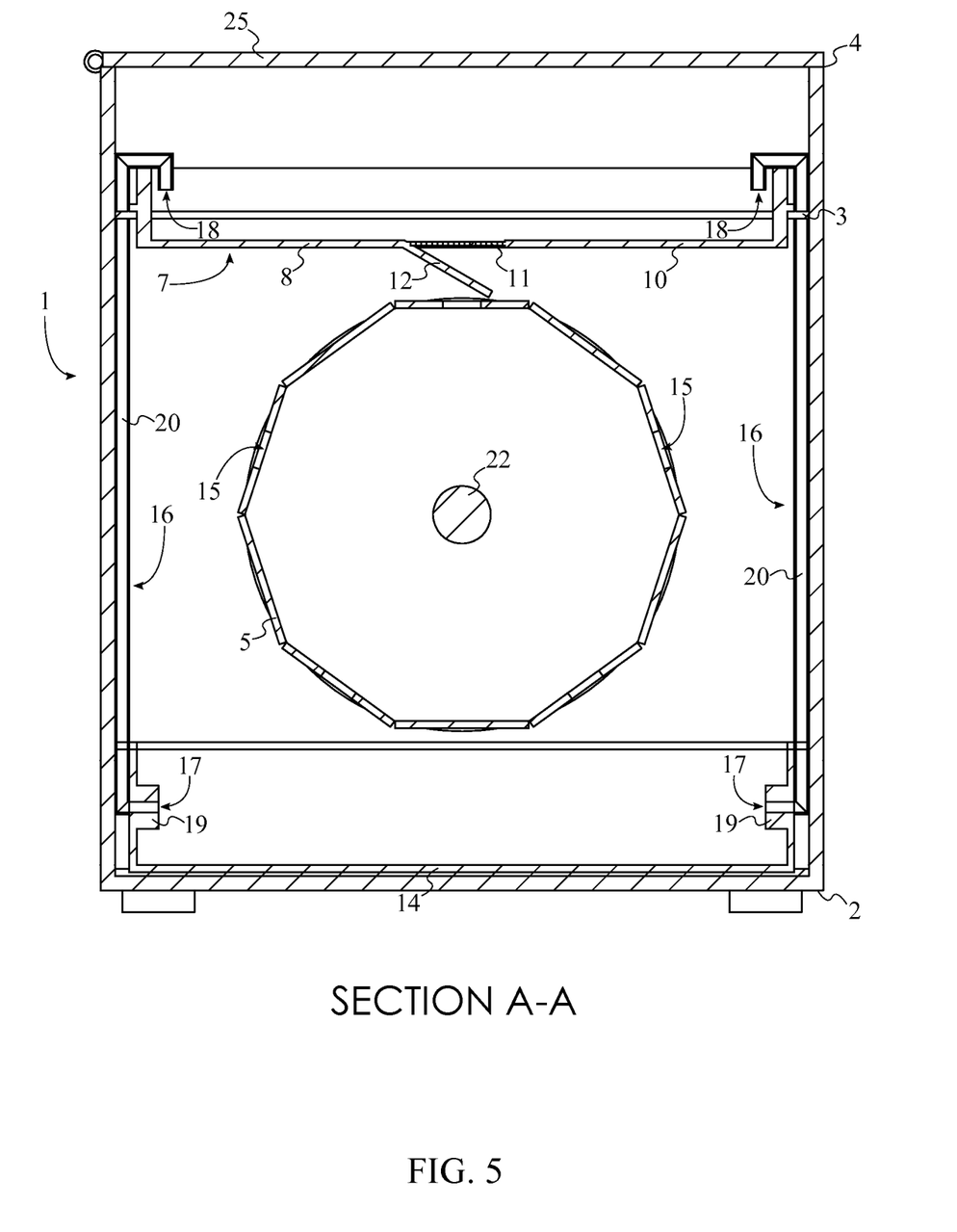
FIG. 5 is a cross-sectional view of the present invention taken along line A-A of FIG. 4.

As shown in FIG. 5, the fluid distribution assembly 16 transports water from the aquaculture reservoir 14 to the filtering germination tray 7. An inlet 17 of the fluid distribution assembly 16 is positioned within the aquaculture reservoir 14, allowing water from the aquaculture reservoir 14 to enter the fluid distribution assembly 16. An outlet 18 of the fluid distribution assembly 16 is positioned within the filtering germination tray 7, allowing the water to exit the fluid distribution assembly 16 into the filtering germination tray 7.

Again with reference to FIGS. 1-5, the aquaculture reservoir 14 holds fish and/or other aquatic animals and is the source of water for the plants grown with the present invention. The animals living within the aquaculture reservoir 14 produce waste that is utilized as nutrients by the plants held on the tubular growing member 5. Because plant roots are oriented outward from the tubular growing member 5, the plant roots are able to come into contact with the water and gain nutrients as well as aid in cleaning the water waste within the aquaculture reservoir 14. The aquaculture reservoir 14 is engaged into the enclosure 1, adjacent to the base 2. This positioning allows the roots of plants held on the tubular growing member 5 to come into contact with water within the aquaculture reservoir 14 as the tubular growing member 5 rotates. The aquaculture reservoir 14 may additionally be removed as needed. The aquaculture reservoir 14 is preferably composed of a clear material to allow visibility of the animals within the aquaculture reservoir 14. Aquatic animals within the aquaculture reservoir 14 may be harvested for food or simply kept to provide nutrients to the plants within the present invention. The aquatic animals may be fed manually by the user. Alternatively, an automatic feeding system may be implemented within the present invention to automatically feed the aquatic animals at timed intervals.

The present invention further comprises a plant grow light 22. The plant grow light 22 requires a power source and provides plants with light that the plants require to grow and flourish. The plant grow light 22 is mounted into the enclosure 1, allowing the plant grow light 22 to provide light within the interior of the enclosure 1. The plant grow light 22 is positioned within the tubular growing member 5, allowing the plant grow light 22 to provide light to plants that are held in place on the tubular growing member 5. The plants are thus able to grow toward the center of the tubular growing member 5. The heat emitted by the plant grow light 22 during operation may additionally be utilized to maintain a warm water temperature for the aquatic animals within the aquaculture reservoir 14 and a warm air temperature for the plants.

Figure 3:
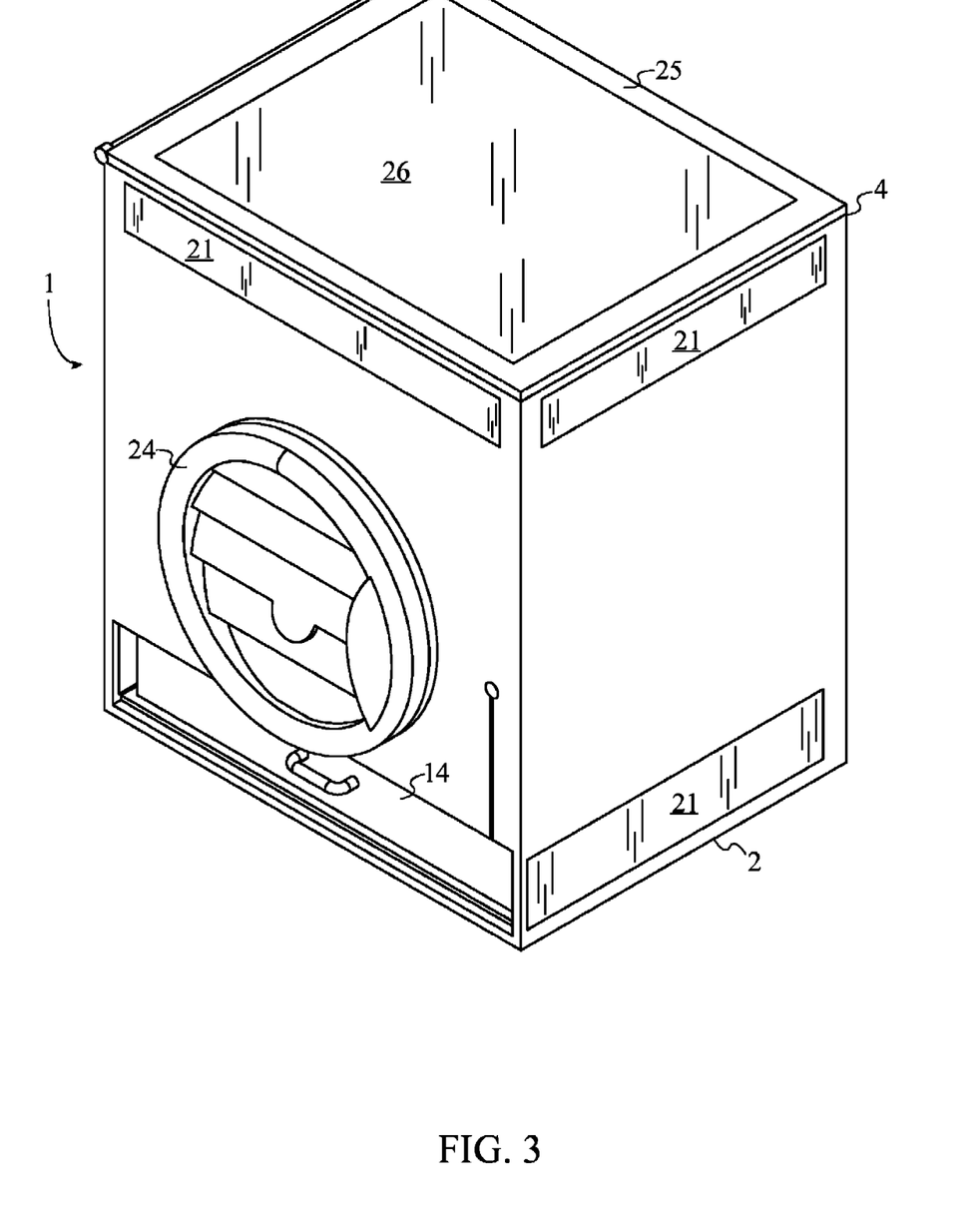
FIG. 3 is a perspective view of the present invention with closed lid and closed shuttered door.
Figure 4:
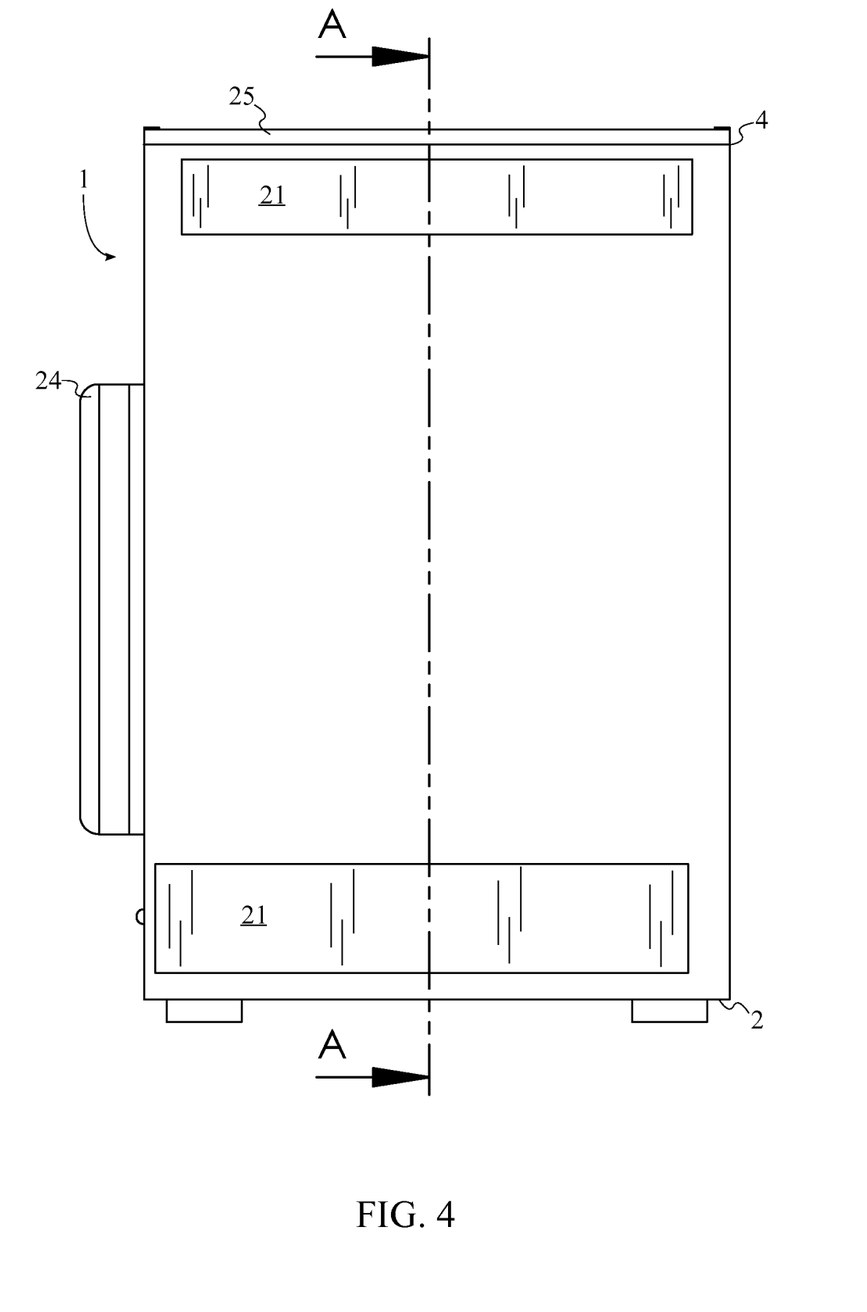
FIG. 4 is a right side view of the present invention.

As shown in FIGS. 1-3, the present invention further comprises a plurality of monitoring windows 21. The plurality of monitoring windows 21 provides the user with vision of the interior of the enclosure 1. The plurality of monitoring windows 21 is positioned about the enclosure 1, adjacent to the aquaculture reservoir 14 and the filtering germination tray 7. This allows the user to view animals within the aquaculture reservoir 14 as well as plants that are germinating within the filtering germination tray 7 from the exterior of the enclosure 1.

Again referring to FIG. 5, the fluid distribution assembly 16 comprises at least one pump 19 and at least one feed pipe 20. The at least one pump 19 is able to move water from the aquaculture reservoir 14 into the at least one feed pipe 20. The at least one feed pipe 20 serves as a conduit for the water once the water has exited the aquaculture reservoir 14 and is being transported to the filtering germination tray 7. The at least one pump 19 is mounted within the aquaculture reservoir 14 and the inlet 17 traverses into the at least one pump 19, allowing water within the aquaculture reservoir 14 to be drawn into the at least one pump 19. The aquaculture reservoir 14 is in fluid communication with the at least one feed pipe 20 through the at least one pump 19. As such, water from the aquaculture reservoir 14 is drawn through the at least one pump 19 and into the at least one feed pipe 20. The water is then able to exit the at least one feed pipe 20 into the filtering germination tray 7 via the outlet 18. Like the plant grow light 22, the at least one pump 19 requires a power source.

The present invention further comprises an access port 23 and a shuttered door 24 as shown in FIG. 1 and FIG. 2. The access port 23 provides access to the tubular growing member 5 from the exterior of the enclosure 1 and enables the user to place plants into the plurality of plant container slots 15. The shuttered door 24 is utilized to close the access port 23 and keep heat, humidity, and moisture within the enclosure 1. The shuttered door 24 may additionally be partially opened in order to allow a select amount of air into the enclosure 1. The access port 23 traverses into the enclosure 1, allowing the interior of the enclosure 1 to be accessed through the access port 23. The tubular growing member 5 is concentrically aligned with the access port 23 as well. This allows the user to easily place vessels containing plants and soil into the tubular growing member 5 through the access port 23. The shuttered door 24 is hingedly mounted to the enclosure 1, adjacent to the access port 23, allowing the shuttered door 24 to be closed over the access port 23 as needed.

Because the top end 4 is preferably open, the present invention further comprises a lid 25 and a lid window 26. The lid 25 is utilized to close the top end 4 and cover the filtering germination tray 7 as shown in FIG. 2 and FIG. 3. The lid window 26 functions in the same manner as the plurality of monitoring windows 21 and provides the user with additional visibility of the filtering germination tray 7 when the lid 25 is closed over the top end 4. The lid 25 is hingedly mounted to the enclosure 1, adjacent to the top end 4. As such, the lid 25 may be easily opened to gain access to the filtering germination tray 7 when the user wishes to place seeds for germination into the filtering germination tray 7. The lid window 26 is positioned within the lid 25, allowing the user to view through the lid 25. The user may additionally mount one or more photovoltaic panels to the lid 25 in order to convert solar energy to electrical energy for the plant grow light 22 and the at least one pump 19.

As shown in FIG. 2 and FIG. 5, the filtering germination tray 7 comprises a first floor portion 8, a second floor portion 10, a grate 11, a ramp 12, and a plurality of germination slots 13. The first floor portion 8 and the second floor portion 10 form a surface for the user to place the seeds for germination. The plurality of germination slots 13 are able to accommodate multiple vessels (e.g. cups) for holding seeds and soil for germination within the filtering germination tray 7. Additionally, rocks or pebbles may be strewn about the first floor portion 8 and the second floor portion 10 in order to aid in filtering water transported to the filtering germination tray 7 from the aquaculture reservoir 14. Filtering the water is essential to maintaining the health of the aquatic animals within the aquaculture reservoir 14. Solid waste that accumulates in the filtering germination tray 7 may eventually break down to a more manageable level for the plant roots. Alternatively, if the solid waste accumulation becomes excessive, the solid waste may be removed manually.

Figure 10:
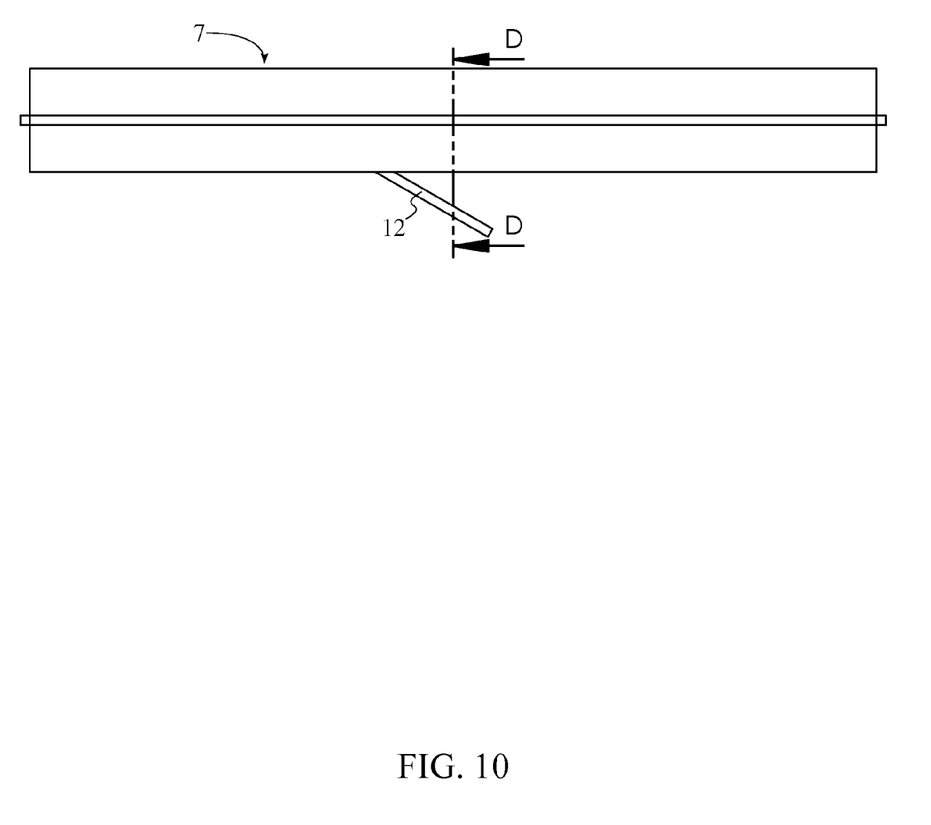
FIG. 10 is a front view of the filtering germination tray.
Figure 11:
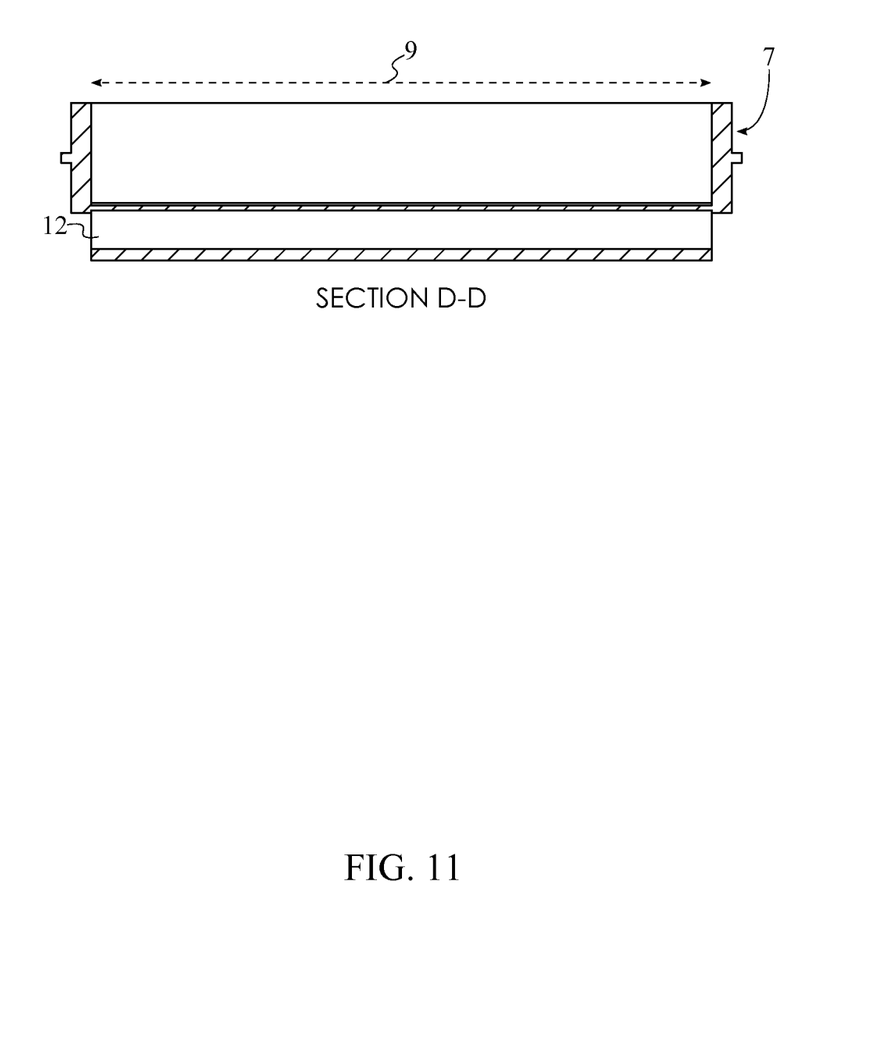
FIG. 11 is a cross-sectional view of the filtering germination tray taken along line D-D of FIG. 10.

The grate 11 enables water to exit the filtering germination tray 7 while the ramp 12 positions water exiting the filtering germination tray 7 over the tubular growing member 5 in a manner that allows the tubular growing member 5 to rotate when the water comes into contact. The grate 11 additionally prevents the rocks and pebbles from escaping the filtering germination tray 7 and provides an additional level of solid waste filtration for the water. The first floor portion 8, the second floor portion 10, and the grate 11 are oriented parallel to each other, forming an essentially flat surface for the filtering germination tray 7. The grate 11 is connected in between the first floor portion 8 and the second floor portion 10. As such, water that has accumulated on the first floor portion 8 and the second floor portion 10 is able to exit the filtering germination tray 7 through the grate 11. As seen in FIG. 5, FIG. 10, and FIG. 11, the ramp 12 is connected across a width 9 of the first floor portion 8, adjacent to the grate 11. As such, water exiting the filtering germination tray 7 from the first floor portion 8 exits through the ramp 12 and is positioned over the tubular growing member 5. Water exiting the filtering germination tray 7 from the second floor portion 10 forms a waterfall effect due to the definitive edge formed by the second floor portion 10 and the grate 11. The water is thus able to flow directly downward and come into contact with water exiting the filtering germination tray 7 through the ramp 12 before coming into contact with the tubular growing member 5. The ramp 12 is angularly offset from the grate 11 and is positioned opposite to the plurality of germination slots 13. The ramp 12 is thus oriented in a manner such that water is able to freely flow downward from the first floor portion 8 to a position directly over the tubular growing member 5. In addition to serving to rotate the tubular growing member 5, the water falling from the filtering germination tray 7 onto the tubular growing member 5 additionally provides nutrients to the plant roots that are oriented outward from the tubular growing member 5.

The plurality of germination slots 13 is evenly distributed across the first floor portion 8 and the second floor portion 10 as shown in FIG. 1 and FIG. 2. As such, the vessels holding seeds and soil may be positioned on the first floor portion 8 and the second floor portion 10 for germination. The plurality of germination slots 13 traverses into the first floor portion 8 and the second floor portion 10, allowing the plurality of germination slots 13 to hold the vessels in a stable position on the first floor portion 8 and the second floor portion 10.

While the lid 25 is able to close the top end 4 and cover the filtering germination tray 7, the lid 25 may alternatively be left open or removed entirely in order to keep the top end 4 open to the environment. This allows the filtering germination tray 7 to be utilized to grow larger plants that require more space than is provided when the lid 25 is closed over the top end 4.

Figure 8:
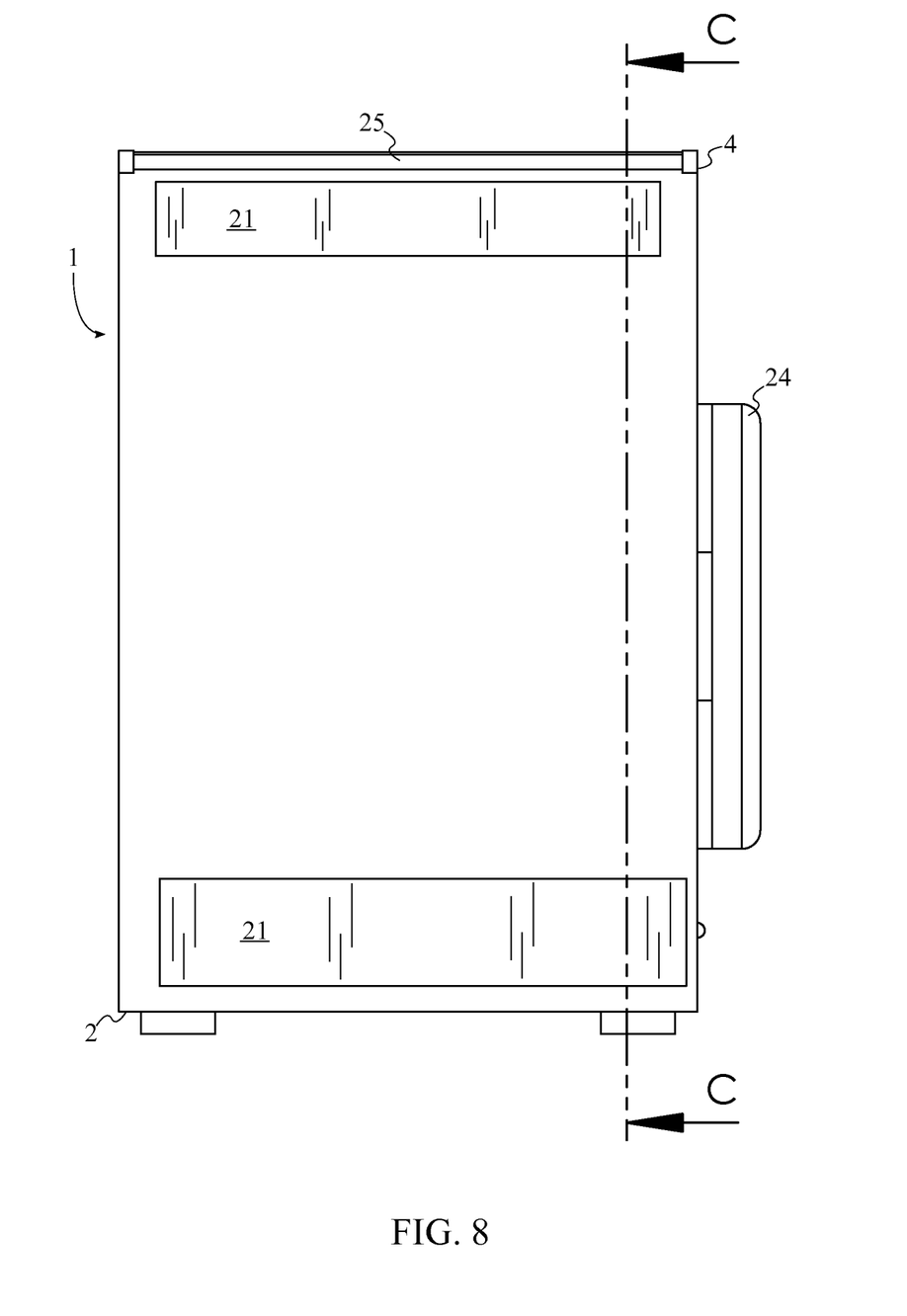
FIG. 8 is a left side view of the present invention.
Figure 9:
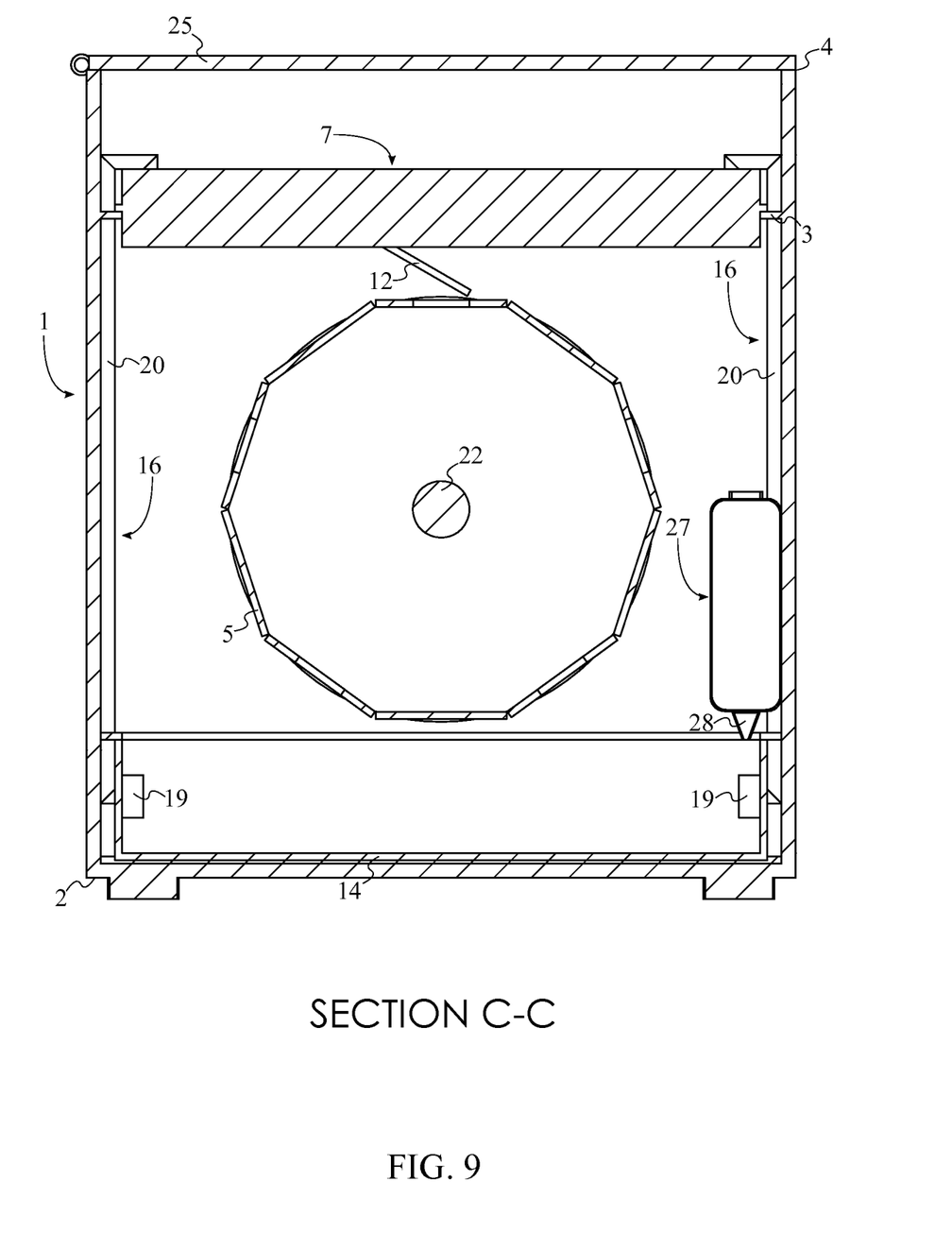
FIG. 9 is a cross-sectional view of the present invention taken along line C-C of FIG. 8.

The present invention further comprises a refill reservoir 27 as shown in FIG. 8 and FIG. 9. The refill reservoir 27 is a vessel that is utilized to hold water for refilling the aquaculture reservoir 14 as the water in the aquaculture reservoir 14 is expended. The refill reservoir 27 is mounted within the enclosure 1, adjacent to the aquaculture reservoir 14. Placing the refill reservoir 27 in close proximity to the aquaculture reservoir 14 allows water to be transferred directly from the refill reservoir 27 to the aquaculture reservoir 14. The refill reservoir 27 is positioned in between the top end 4 and the aquaculture reservoir 14. The refill reservoir 27 may thus be refilled itself by removing the filtering germination tray 7 from the top end 4 and pouring water directly into the refill reservoir 27. The refill reservoir 27 is additionally positioned in a manner to prevent interference with the rotation of the tubular growing member 5. A nozzle 28 of the refill reservoir 27 is positioned adjacent to the aquaculture reservoir 14. The nozzle 28 is positioned to allow water from the refill reservoir 27 to fall by gravity directly into the aquaculture reservoir 14. A water level indicator may be present on the enclosure 1 to allow the user to view the water level within the refill reservoir 27 from the exterior of the enclosure 1. As such, the refill reservoir 27 is preferably composed of a clear material to facilitate visibility of the water within. The refill reservoir 27 may automatically refill the aquaculture reservoir 14 or the user may be required to manually refill the aquaculture reservoir 14 through the refill reservoir 27.

The present invention may additionally include a monitoring system for the aquaculture reservoir 14 that is capable of monitoring nitrogen, oxygen, pH, and temperature levels of the water within the aquaculture reservoir 14. The monitoring system may be integrated with the fluid distribution assembly 16 in order to allow the fluid distribution assembly 16 to adjust the flow of water throughout the present invention to maintain the desired water quality within the aquaculture reservoir 14.

Although the present invention has been explained in relation to its preferred embodiment, it is understood that many other possible modifications and variations can be made without departing from the spirit and scope of the present invention as hereinafter claimed.

What is claimed is:
1. A symbiotic aquaponic growth system comprises:
an enclosure;
a filtering germination tray;
a tubular growing member;
an aquaculture reservoir;
a plurality of plant container slots;
a fluid distribution assembly;
the enclosure comprises a base, a lip, and a top end;
the base and the top end being positioned opposite to each other on the enclosure;
the lip being connected within the top end; the filtering germination tray being seated onto the lip;
the tubular growing member being rotatably mounted within the enclosure in between the base and the top end;
an axis of the tubular growing member being oriented parallel to the base; the plurality of plant container slots laterally traversing into the tubular growing member;
the tubular growing member being positioned in between the filtering germination tray and the aquaculture reservoir;
the aquaculture reservoir being engaged into the enclosure, adjacent to the base;
an inlet of the fluid distribution assembly being positioned within the aquaculture reservoir; and an outlet of the fluid distribution assembly being positioned within the filtering germination tray; and
a plant grow light;
the plant grow light being mounted into the enclosure; and
the plant grow light being positioned within the tubular growing member.

2. The symbiotic aquaponic growth system as claimed in claim 1 further comprises:
a plurality of monitoring windows; and
the plurality of monitoring windows being positioned about the enclosure, adjacent to the aquaculture reservoir and the filtering germination tray.

3. The symbiotic aquaponic growth system as claimed in claim 1 further comprises:
the fluid distribution assembly comprises at least one pump and at least one feed pipe;
the at least one pump being mounted within the aquaculture reservoir;
the aquaculture reservoir being in fluid communication with the at least one feed pipe through the at least one pump; and
the inlet traversing into the at least one pump.

4. The symbiotic aquaponic growth system as claimed in claim 1 further comprises:
an access port;
a shuttered door;
the access port traversing into the enclosure;
the tubular growing member being concentrically aligned with the access port; and
the shuttered door being hingedly mounted to the enclosure, adjacent to the access port.

5. The symbiotic aquaponic growth system as claimed in claim 1 further comprises:
a lid;
a lid window;
the lid being hingedly mounted to the enclosure, adjacent to the top end; and
the lid window being positioned within the lid.

6. The symbiotic aquaponic growth system as claimed in claim 1 further comprises:
the filtering germination tray comprises a first floor portion, a second floor portion, a grate, a ramp, and a plurality of germination slots;
the first floor portion, the second floor portion, and the grate being oriented parallel to each other;
the grate being connected in between the first floor portion and the second floor portion;
the ramp being connected across a width of the first floor portion, adjacent to the grate;
the ramp being angularly offset from the grate;
the ramp being positioned opposite to the plurality of germination slots;
the plurality of germination slots being evenly distributed across the first floor portion and the second floor portion; and
the plurality of germination slots traversing into the first floor portion and the second floor portion.

7. The symbiotic aquaponic growth system as claimed in claim 1 further comprises:
a refill reservoir;
the refill reservoir being mounted within the enclosure, adjacent to the aquaculture reservoir;
the refill reservoir being positioned in between the top end and the aquaculture reservoir; and
a nozzle of the refill reservoir being positioned adjacent to the aquaculture reservoir.

8. A symbiotic aquaponic growth system comprises:
an enclosure;
a filtering germination tray;
a tubular growing member;
an aquaculture reservoir;
a plurality of plant container slots;
a fluid distribution assembly;
the enclosure comprises a base, a lip, and a top end;
the filtering germination tray comprises a first floor portion, a second floor portion, a grate, a ramp, and a plurality of germination slots;
the base and the top end being positioned opposite to each other on the enclosure;
the lip being connected within the top end;
the filtering germination tray being seated onto the lip;
the tubular growing member being rotatably mounted within the enclosure in between the base and the top end;
an axis of the tubular growing member being oriented parallel to the base;
the plurality of plant container slots laterally traversing into the tubular growing member;
the tubular growing member being positioned in between the filtering germination tray and the aquaculture reservoir;
the aquaculture reservoir being engaged into the enclosure, adjacent to the base;
an inlet of the fluid distribution assembly being positioned within the aquaculture reservoir;
an outlet of the fluid distribution assembly being positioned within the filtering germination tray;
the first floor portion, the second floor portion, and the grate being oriented parallel to each other;
the grate being connected in between the first floor portion and the second floor portion;
the ramp being connected across a width of the first floor portion, adjacent to the grate;
the ramp being angularly offset from the grate;
the ramp being positioned opposite to the plurality of germination slots;
the plurality of germination slots being evenly distributed across the first floor portion and the second floor portion; and
the plurality of germination slots traversing into the first floor portion and the second floor portion.

9. The symbiotic aquaponic growth system as claimed in claim 8 further comprises:
a plant grow light;
the plant grow light being mounted into the enclosure; and
the plant grow light being positioned within the tubular growing member.

10. The symbiotic aquaponic growth system as claimed in claim 8 further comprises:
a plurality of monitoring windows; and
the plurality of monitoring windows being positioned about the enclosure, adjacent to the aquaculture reservoir and the filtering germination tray.

11. The symbiotic aquaponic growth system as claimed in claim 8 further comprises:
the fluid distribution assembly comprises at least one pump and at least one feed pipe;
the at least one pump being mounted within the aquaculture reservoir; the aquaculture reservoir being in fluid communication with the at least one feed pipe through the at least one pump; and
the inlet traversing into the at least one pump.

12. The symbiotic aquaponic growth system as claimed in claim 8 further comprises:
- an access port; a shuttered door;
- the access port traversing into the enclosure;
- the tubular growing member being concentrically aligned with the access port; and
- the shuttered door being hingedly mounted to the enclosure, adjacent to the access port.

13. The symbiotic aquaponic growth system as claimed in claim 8 further comprises:
- a lid;
- a lid window;
- the lid being hingedly mounted to the enclosure, adjacent to the top end; and
- the lid window being positioned within the lid.

14. The symbiotic aquaponic growth system as claimed in claim 8 further comprises:
- a refill reservoir;
- the refill reservoir being mounted within the enclosure, adjacent to the aquaculture reservoir;
- the refill reservoir being positioned in between the top end and the aquaculture reservoir; and
- a nozzle of the refill reservoir being positioned adjacent to the aquaculture reservoir.

\* \* \* \* \*